(12) United States Patent
Berger

(10) Patent No.: US 8,740,379 B2
(45) Date of Patent: Jun. 3, 2014

(54) EYEGLASSES RETENTION SYSTEM

(71) Applicant: Keith Berger, Boulder, CO (US)

(72) Inventor: Keith Berger, Boulder, CO (US)

(*) Notice: Subject to any disclaimer, the term of this patent is extended or adjusted under 35 U.S.C. 154(b) by 0 days.

(21) Appl. No.: 13/684,143

(22) Filed: Nov. 21, 2012

(65) Prior Publication Data

US 2014/0063443 A1    Mar. 6, 2014

Related U.S. Application Data

(63) Continuation of application No. 13/605,996, filed on Sep. 6, 2012, now abandoned.

(51) Int. Cl.
*G02C 3/00* (2006.01)
*G02C 3/02* (2006.01)

(52) U.S. Cl.
CPC .............. *G02C 3/02* (2013.01); *G02C 2200/02* (2013.01)
USPC .......................................... 351/155; 351/158

(58) Field of Classification Search
CPC ......... G02C 3/00; G02C 3/02; G02C 2200/02
USPC ............ 351/41, 111, 121, 123, 155, 156, 158
See application file for complete search history.

(56) References Cited

U.S. PATENT DOCUMENTS

| 264,574 A | 9/1882 | Shone |
| 857,838 A | 6/1907 | Shaw |
| 1,514,111 A | 1/1923 | Sutton |
| 2,766,657 A | 10/1956 | Nathan |
| 4,179,753 A | 12/1979 | Aronberg |
| 4,636,048 A | 1/1987 | Jones |
| 5,860,167 A | 1/1999 | Lizio |
| 5,987,652 A * | 11/1999 | Fowler ............... 2/424 |
| 5,996,116 A | 12/1999 | Tate |
| 6,247,177 B1 | 6/2001 | Hayes |
| 6,397,396 B1 | 6/2002 | Vibert |
| 6,481,059 B2 | 11/2002 | Morris |
| 6,647,554 B1 | 11/2003 | Yan |
| 6,671,885 B2 | 1/2004 | Viggiano |
| 6,892,393 B1 | 5/2005 | Provost |
| 7,325,920 B1 * | 2/2008 | Gelfuso ............... 351/155 |
| 7,340,781 B2 | 3/2008 | Clark |
| 7,926,938 B2 * | 4/2011 | Lu ............... 351/155 |
| 2005/0039240 A1 | 2/2005 | Kidouchim |
| 2005/0263661 A1 | 12/2005 | Park |
| 2006/0152671 A1 * | 7/2006 | Risso et al. ............... 351/155 |
| 2008/0084531 A1 | 4/2008 | Pilarski |
| 2009/0056000 A1 | 3/2009 | de Taboada |
| 2009/0235437 A1 | 9/2009 | Springer |
| 2009/0284712 A1 * | 11/2009 | Brooks ............... 351/155 |
| 2010/0014046 A1 | 1/2010 | Millios |
| 2010/0212067 A1 | 8/2010 | Thomas |
| 2010/0231851 A1 | 9/2010 | Anhalt |

FOREIGN PATENT DOCUMENTS

| CN | 201083886 | 7/2008 |
| CN | 20113896 | 11/2009 |
| KR | 20050008134 | 1/2008 |

* cited by examiner

*Primary Examiner* — Huy K Mai
(74) *Attorney, Agent, or Firm* — Will Hunziker

(57) ABSTRACT

An eyeglass retention system for coupling eyewear and headwear through the use of magnets attached to the temples or arms of glasses and magnetic or metallic elements attached to headwear. Vertical supports and other attachment structures prevent inserts from falling out while multi-point magnetic coupling and safety features enhance performance.

20 Claims, 4 Drawing Sheets

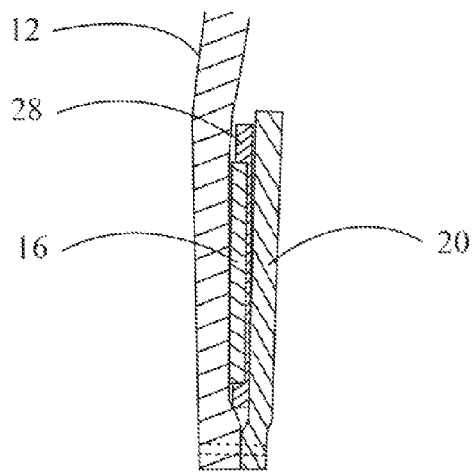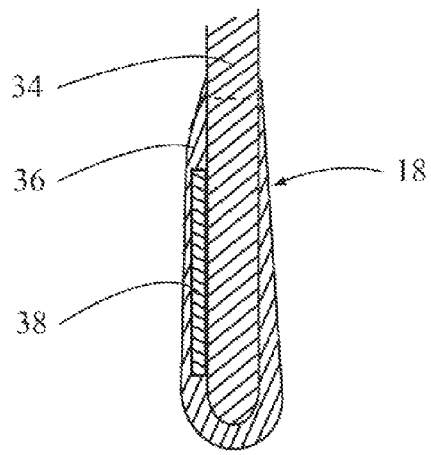
Fig. 3  Fig. 4
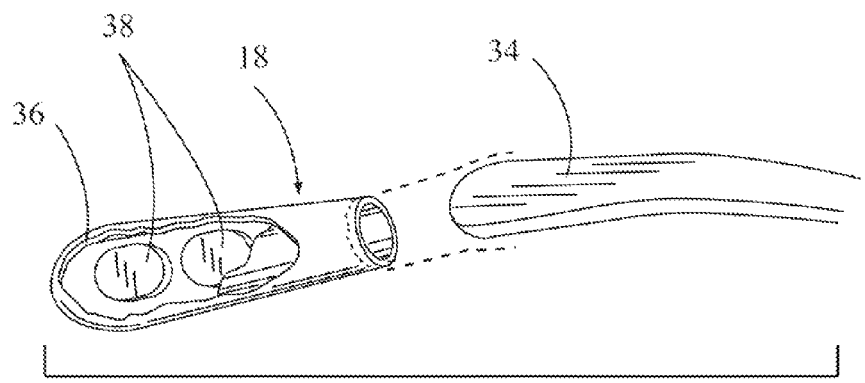
Fig. 5
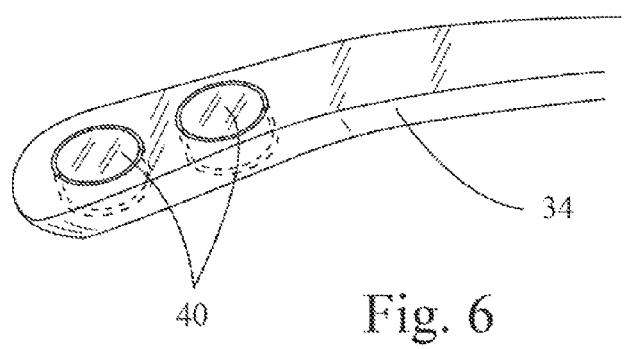
Fig. 6

_US 8,740,379 B2_

EYEGLASSES RETENTION SYSTEM

CROSS-REFERENCE TO RELATED APPLICATION(S)

This document is a continuation application and claims the benefit of, and priority to, U.S. patent application Ser. No. 13/605,996, filed on Sep. 6, 2012, which is herein incorporated by reference in its entirety for all purposes.

TECHNICAL FIELD

The present disclosure generally relates to systems for attaching glasses to headwear; and, specifically, the present disclosure relates to systems for attaching magnets to the temples of glasses and for using those magnets to attach those glasses to a metallic element attached to, or built into, the headwear.

BACKGROUND

There are a number of methods currently used to bring about the retention of glasses or sunglasses on the head or body while not in use. The most popular of which are cords that attach to either temple, also called arms, of a pair of glasses which hang behind the wearer's head; thus preventing the glasses from falling forward beyond the length of the cord while allowing the wearer to hang the glasses about the body when not in use, usually on one's chest, from the cord around the wearer's neck.

There are several disadvantages to both wearing and securing one's glasses in this manner, a brief list of these disadvantages follows: (a) when the glasses hang from the wearer's neck, they are vulnerable to damage as a result of movement of the arms and body, whereby this vulnerability increases if the wearer is both bending and using their arms to manipulate objects in front of their face; (b) when the glasses are worn, the cord extends from the glasses backwards and have the potential to catch on something behind the wearer's head; (c) storage of the glasses is complicated by the need to either remove and separately store, or wrap the cord about the glasses, either process necessarily needing reversal for subsequent use of the glasses; and (d) the cord can be easily seen, decreasing the aesthetic value of the glasses.

The present disclosure adequately solves these related art disadvantages by storing the glasses on headwear without the use of a cord while maintaining many of the advantages of securing glasses offered by the use of a cord. Further objects and advantages of the present disclosure are below outlined.

SUMMARY

The present disclosure can provide a number of advantages depending on the particular aspect, embodiment, and/or configuration. None of the particular objects or advantages that follow must be entirely satisfied as they are non-exclusive alternatives; and at least one of the following objects is met; accordingly, several objects and advantages of the present disclosure are:

(a) to provide a feature for attaching glasses to headwear;

(b) to provide a feature for attaching glasses to headwear that allow for the glasses to remain in a secure and stable position on the headwear despite movement of the wearer's head and body;

(c) to provide a feature for attaching glasses to headwear that allow the glasses to be quickly and conveniently attached and detached;

(e) to provide a feature for attaching glasses to headwear that allows for removal and reinstallation of such feature;

(g) to provide a feature for attaching glasses to headwear that allows for quick and easy installation, removal, and reinstallation of such feature;

(f) to provide a feature for attaching glasses to headwear that allows for concealment of the feature for attachment and does not detract significantly from the aesthetics of the glasses or the headwear;

(h) to provide a feature for attaching glasses to headwear that allows for secure installation of such feature for attachment to both the glasses and the headwear;

(i) to provide a feature for attaching glasses to headwear that is cheap and easy to produce; and (j) to provide a method for producing such feature for attaching glasses to headwear.

These and other objectives and advantages of the present disclosure will become apparent from the following description, taken in conjunction with the accompanying drawings, wherein, by way of illustration and example, certain embodiments of the present disclosure are set forth. The drawings are intended to constitute a part of this specification and include exemplary embodiments of the present disclosure and illustrate various objects and features thereof

BRIEF DESCRIPTION OF THE DRAWINGS

1. FIGURES

Figure 1:
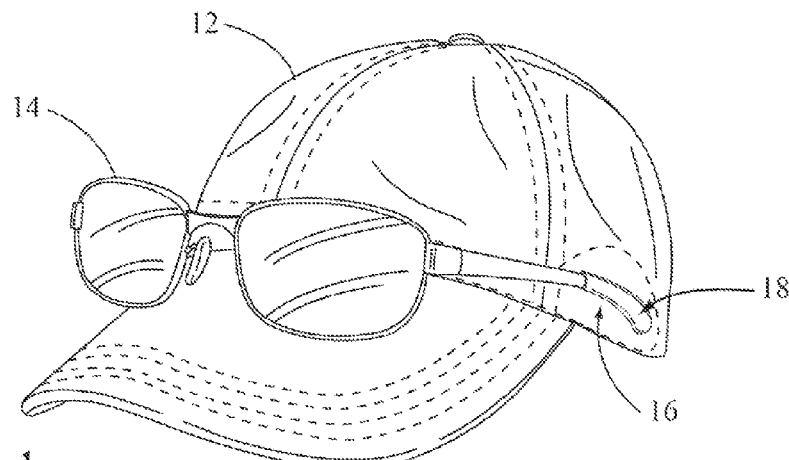

FIG. 1 is an isometric perspective view of a complete eyeglass retention system installed in a hat and on a pair of glasses, according to embodiments of the present disclosure.

Figure 2:
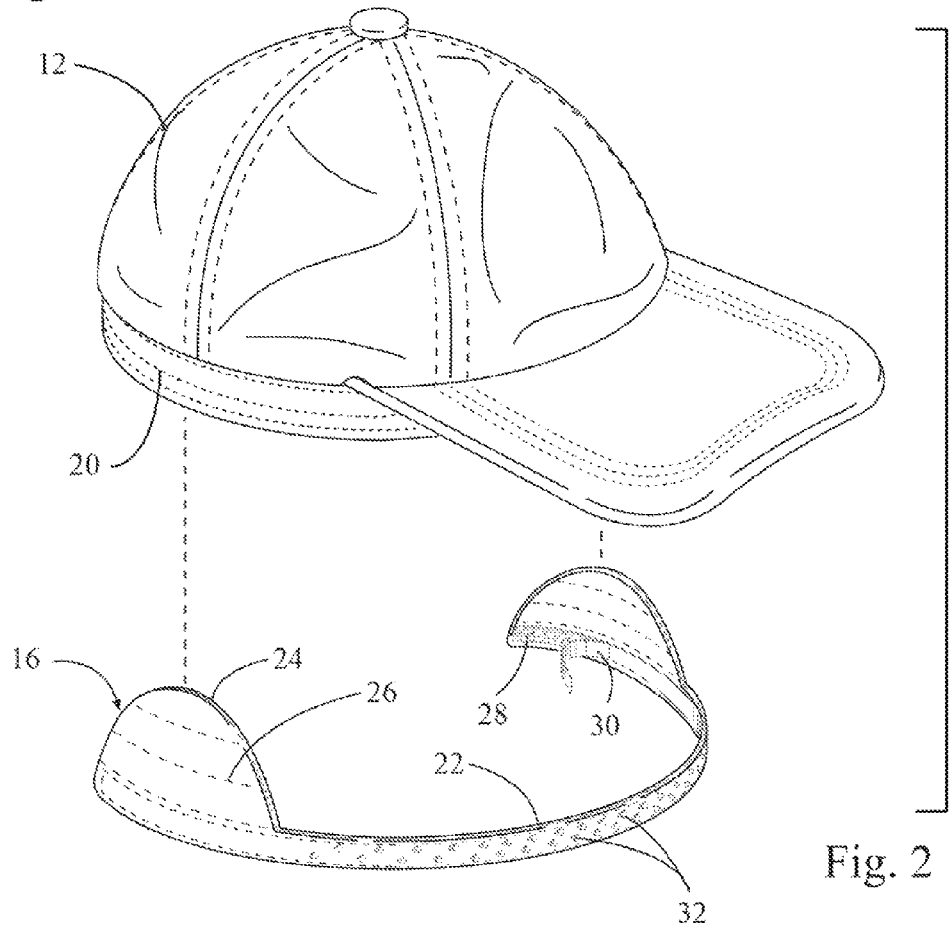

FIG. 2 is an isometric perspective view of a hat with the inner sweat band folded down and a hat insert, according to embodiments of the present disclosure.

FIG. 3 is a cross-section view of a hat insert, according to embodiments of the present disclosure.

FIG. 4 is a cross-section view of a magnetic temple attachment to a temple of a pair of eyeglasses, according to embodiments of the present disclosure.

FIG. 5 is a perspective cut away view of a magnetic temple attachment with two magnets and the temple of a pair of eyeglasses, according to embodiments of the present disclosure.

FIG. 6 is a perspective view of magnets embedded in a temple of a pair of eyeglasses, according to embodiments of the present disclosure.

Figure 7:
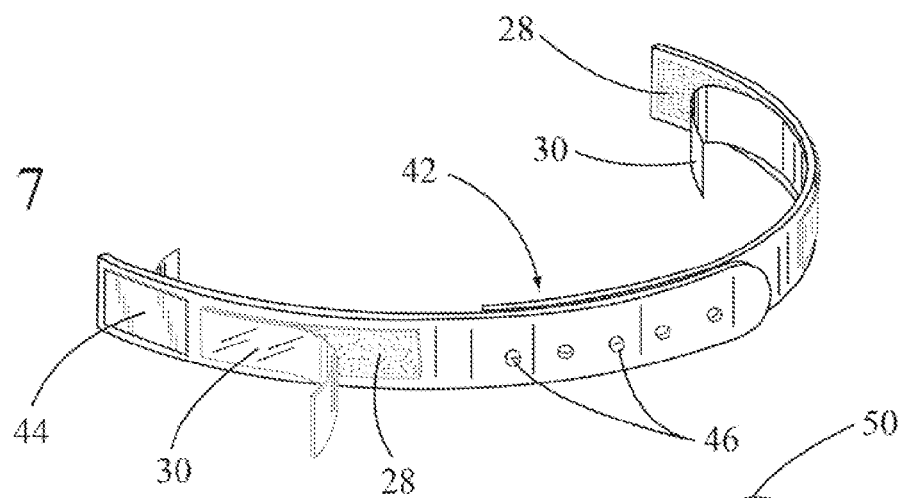

FIG. 7 is a perspective view of a hat insert, according to embodiments of the present disclosure.

Figure 8:
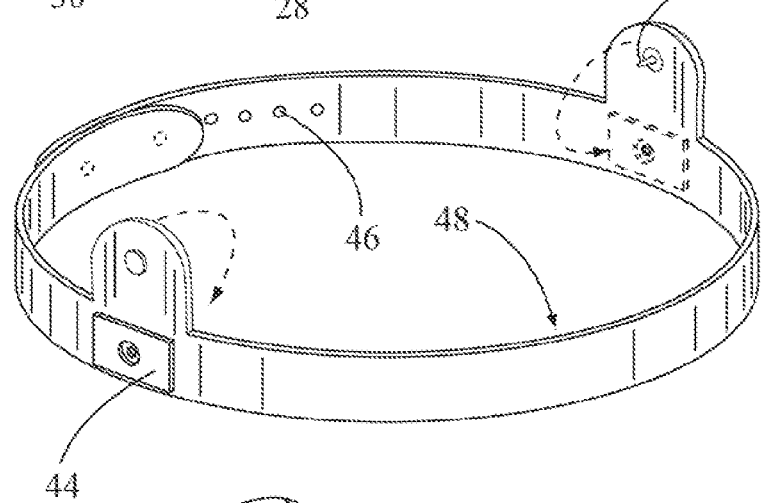

FIG. 8 is a perspective view of a hat insert, according to embodiments of the present disclosure.

Figure 9:
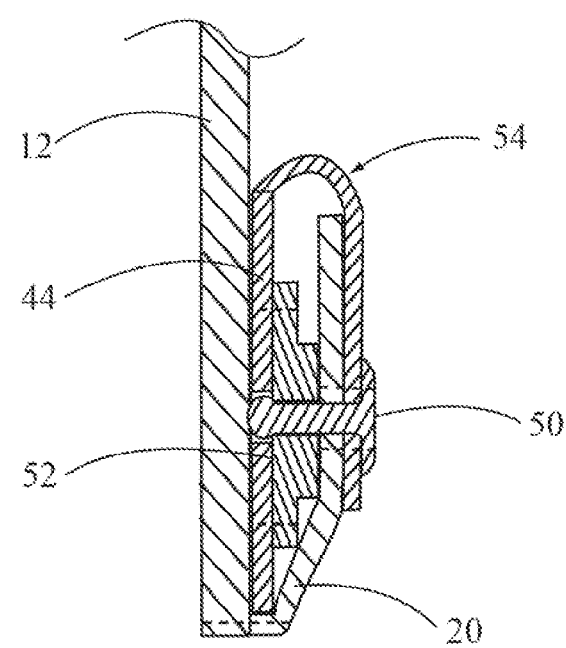

FIG. 9 is a cross-section view of a hat insert clipping mechanism, according to embodiments of the present disclosure.

Figure 10:
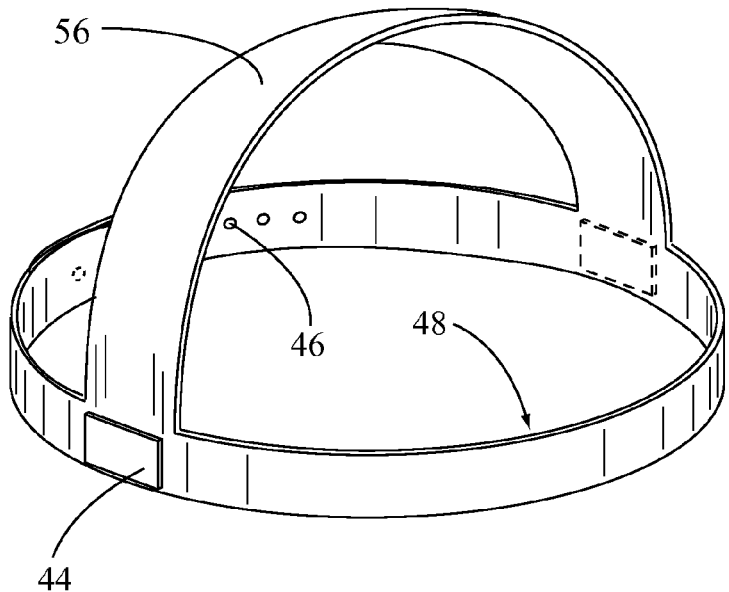

FIG. 10 is a perspective view of a hat insert with a vertical support, according to embodiments of the present disclosure.

Figure 11:
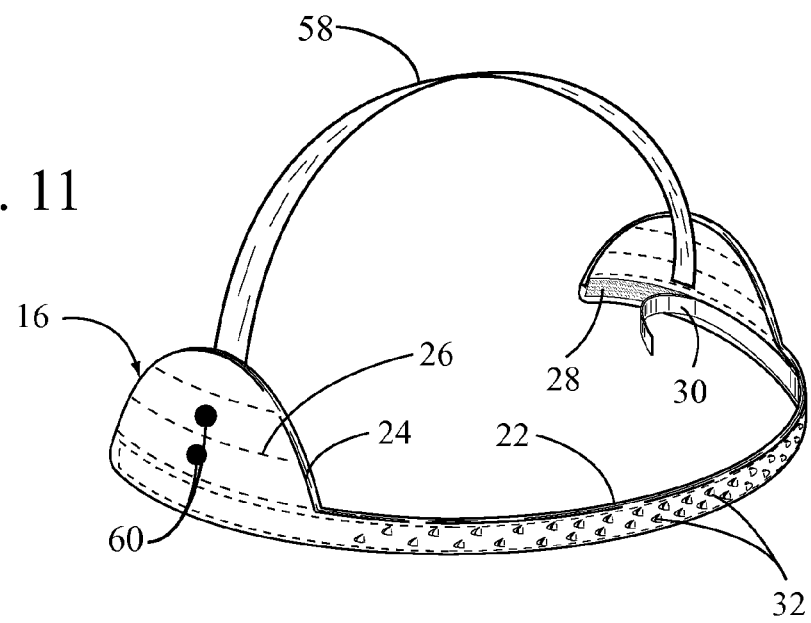

FIG. 11 is a perspective view of a hat insert with a vertical support, according to embodiments of the present disclosure.

2. REFERENCE NUMERALS

12 A hat
14 Eyeglasses
16 Metallic or magnetic insert
18 Magnetic temple attachment
20 Sweatband
22 Forward connecting portion 24 Folded edge of metallic sweatband insert
26 Creases for collapsibility
28 Adhesive layers
30 Adhesive coverings
32 Textures, hooks, perforations
34 Temple of eyeglasses
36 Elastic materials
38 Magnet(s)
40 Embedded magnets
42 Short adjustable hat insert
44 Metal or magnetic plate
46 Adjustable snaps
48 Circular adjustable hat insert
50 Snap grommet insert
52 Snap grommet receptacle
54 Foldable tab
56 Vertical support
58 Attachable vertical support
60 Pressure fitted snaps

DETAILED DESCRIPTION

For the purposes of promoting an understanding of the principles of the present disclosure, reference will now be made to the embodiments illustrated in the drawings and specific language will be used to describe the same. However, the illustrated embodiments are merely exemplary and many additional embodiments in accordance with the present disclosure are possible. For example, baseball caps are pictured; however, the subject matter of the present disclosure can be applied to most headwear. It is understood that no limitation of the scope of the present disclosure is thereby intended. Any alterations and further modifications in the illustrated devices, and such further application of the principles of the present disclosure, as illustrated herein, are contemplated as would normally occur to one skilled in the art to which the present disclosure relates.

Unless otherwise indicated, the drawings are intended to be read, e.g., arrangement of parts, proportion, degree, etc., together with the specification, and are to be considered a portion of the entire written description of the present disclosure. As used in the following description, the terms "horizontal," "vertical," "left," "right," "up," and "down" as well as adjectival and adverbial derivatives thereof, e.g., "horizontally", "rightwardly," "upwardly," etc., simply refer to the orientation of the illustrated structure as the particular drawing figure faces the reader. Similarly, the terms "inwardly" and "outwardly" generally refer to the orientation of a surface relative to its axis of elongation or axis of rotation, as appropriate.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" denotes A alone, B alone, C alone, A and B together, A and C together, B and C together, or A, B and C together. The terms "a" or "an" element refers to one or more of that element. As such, the terms "a" or "an", "one or more," and "at least one" can be herein used interchangeably. It is also to be noted that the terms "comprising," "including," and "having" can be used interchangeably.

Shown throughout the figures, the present disclosure is generally directed toward attaching glasses to headwear. An embodiment of such system of attaching eyewear, e.g., glasses, to headwear is illustrated in FIG. 1; which illustrates an isometric perspective view of the basic appearance of the system in actual use with a hat 12, which could be visor or any kind of headwear; and a pair of glasses 14, which could be library styled glasses with straight temples, or arms, or any other kind of glasses. In addition to hats and glasses, the system also comprises the use of magnetic coupling. In this embodiment, that coupling is achieved through the use of a metallic insert 16 and magnetic temple attachments 18. Like the hat and the glasses, the magnetic coupling device can be comprised in part(s) of either one or many magnets of a variety of shapes and sizes attached in a variety of ways to the temples of glasses, such as: embedded in the temples, embedded in an elastic temple attachment, glued to the glasses, taped to the glasses or otherwise fastened to the glasses in any other way. The other part(s) of the magnetic coupling could be either one or plural of: metal plates, metal meshes, or any other ferrous and/or magnetic material capable of coupling with a magnet which is attached to the hat.

FIG. 2 illustrates an isometric perspective view of an embodiment of the present disclosure, showing a hat 12 with the inner sweat band 20 folded down as to be visible and a metallic insert 16. The metallic insert 16 pictured in FIG. 2 can be a solid piece of metal, or a mesh of metal wires, capable of the attachment of a magnet through headwear, which is capable of being concealed between an inward folded sweatband 20 and the outside of a hat 12. The larger, rounded portions on the distal ends of the metallic insert 16 rest above and around the ears of the wearer of the hat and create a broad area for the coupling of magnetic temple attachments 18. Theses broad areas allow for coupling of the hat and the glasses in a manner quick and non-specific to a particular location while also allowing the glasses to move on the hat while maintaining continual magnetic attachment; and the height of these regions also helps to retain the vertical position of the insert in the hat while the forward connecting portion 22 keeps the two metal inserts 16 in the same relative horizontal position.

Some advantages of an insert 16 comprising a solid metal or metal mesh are as follows: (a) the insert 16 can be quickly stamped, folded, and otherwise worked from a sheet; (b) the insert 16 provides a good point of magnetic attraction even through the fabric of a hat; (c) the insert 16 is pliable and, as such, the insert 16 can be reformed easily should the insert 16 become crushed by sitting upon it or otherwise; (d) since the insert 16 is entirely made of metal, there is no need to attach metal to the insert 16; and (e) since human heads are within such similar dimensions that either one, or just a few sizes, the insert 16 could be mass-produced which would accommodate the vast majority of human heads.

The embodiment of the metallic insert 16 shown in FIG. 2 can have several features which improve its functionality: (a) the edges 24 of the insert 16 can be hemmed, rounded, or folded, to create a safer edge for the user to handle; (b) the larger portions of the insert 16 can have seams 26, frangible portions, perforations, points of weakness, or any other features for designed failure, thereby increasing safety for the user and allowing for contouring the insert 16 to the shape of the head or reshaping the insert 16 should the insert 16 become crumpled; (c) the insert 16 can have frangible portions, perforations, hooks 32, texturing, spot welded metal mesh, frayed mesh, or any other features for creating a surface on metal, or metal mesh, with adhesive properties; and (d) the insert 16 can also have an adhesive layer 28, such as an applied layer of actual adhesive, e.g., glue, epoxy, pressure adhesives, thermal adhesives, friction tape, or any other adhesive for attachment. Such adhesive layer may also have a cover 30 to prevent unintentional attachment of the adhesive to other objects.

FIG. 3 illustrates a cross-section view of an insert 16, such as a metallic insert, in accordance with an embodiment of the present disclosure. In this embodiment, the insert 16 is held in place between the hat 12 and the sweatband 20 by an adhesive layer 28; however, many forms of headwear do not include sweatbands. In such other forms of headwear, the structure for metallic coupling of the headwear would not comprise an insert 16 between the exterior of a hat and the interior of the hat's sweatband, but the structure for magnetic coupling that is attached to the hat would have to be a different attachment feature, such as: sewing, embedding, gluing, snapping, clipping, or any other feature for attachment, such as a feature for magnetic coupling into or onto the headwear.

FIG. 4 illustrates a cross-section view of one embodiment of a magnetic temple attachment 18, in accordance with an embodiment of the present disclosure. In this embodiment of the magnetic temple attachments 18, an elastic material 36, such as: stretchy fabric, plastic, shrink wrap, or another material of suitably similar properties capable of housing a magnet or magnets 38 and is attachable to the temple 34, or arms or earpieces of a pair of glasses such that the magnet or magnets 38 can be easily attached or removed. Another embodiment of a magnetic temple attachment, e.g., to the temple, or arms or earpieces, of a pair of eyeglasses is illustrated in a perspective cut-away view in FIG. 5. FIG. 5 is similar to FIG. 4, except that two separate magnets 38 are shown. The use of two magnets 38 creates two points of magnetic attachment, thereby preventing the glasses from rotating about the point of magnetic attraction otherwise created by a single magnet.

FIG. 6 illustrates a perspective view of embedded magnets 40, e.g., embedded in the temple of a pair of eyeglasses 34, according to yet another embodiment of an attachment of magnets to the temples or arms or earpieces of a pair of glasses, in accordance with the present disclosure. Having the embedded magnets 40 disposed in the temples, or arms or earpieces, of the glasses allows for the following advantages: (a) the embedded magnets 40 can be larger and more powerful while not interfering with the aesthetics or comfort of the temples of the glasses; (b) the embedded magnets 40 can be more securely attached to the temples of the glasses; and (c) the embedded magnets 40 can more easily come in direct contact with the hat as no material needs to cover either the magnet or the periphery of its edges. Such embedded magnets 40 and such temples, housing the embedded magnets 40 can themselves be removable from the glasses or the arms or earpieces of glasses making them interchangeable between pairs of glasses.

FIGS. 7 and 8 respectively illustrate perspective views of two alternate embodiments of headwear inserts, in accordance with the present disclosure. Both the short adjustable hat insert 42 shown in FIG. 7 and the circular adjustable hat insert 48 shown in FIG. 8 can comprise any material with sufficient properties for providing durable application for their purpose within headwear, such as plastic, fabric, or metal. FIG. 7 illustrates a short adjustable hat insert 42 that is designed to fit into headwear which, itself, has an adjustable size. FIG. 8 illustrates a circular adjustable hat insert 48 designed to fit into fitted or non-adjustable headwear. Both of the inserts 42, 48 comprise a structure for adjusting their length or circumference, as the case may be. Such structure for adjustment can be snaps 46 as seen on standard baseball caps, buckles, notches, slides, loops, or any other structure for adjustability. Both inserts 42, 48 may also have metal or magnetic plates 44, or other metallic or magnetic elements, such as magnets or metal mesh, and can be of a variable size attached to the inserts 42, 48 for magnetic coupling of the glasses. Both inserts 42, 48 may also have one feature or a plurality of features for attaching the insert 42, 48 between a hat and its sweatband. Such feature or features for attachment may be similar to those described in FIG. 2, such as: an applied layer of adhesive 28 with a covering 30 to prevent unintentional attachment of the adhesive layer, snaps 50 that fold over the sweatband of the hat, textures, hooks, attached metal mesh, or any other feature for creating a surface with adhesive properties.

FIG. 9 illustrates a cross-sectional view of another alternate embodiment of a headwear insert 54, in accordance with the present disclosure. In this embodiment, the metal or magnetic plate 44 is connected to the sweatband 20 of the hat 12 on either side of the hat 12 around the ears of the wearer. Each insert 54 may comprise a metal or magnetic plate 44 and a feature for attachment to the hat 12. In this embodiment, the feature for attachment is a foldable tab which has been folded over a sweatband 20 and attached with a snap grommet insert 50 which has pierced the sweatband 20 of the hat 12 and has been pressure fitted to a snap grommet receptacle 52 that can secure the head of the pin and keep the insert 54 in place. Such feature for attachment of the insert 54 may also be similar to those described in FIG. 2, such as: an applied layer of adhesive with a covering to prevent unintentional attachment of the adhesive layer, textures, hooks, attached metal mesh, or any other attachment feature.

FIGS. 10 and 11 respectively illustrate two embodiments of vertical supports 56, 58 that may be used to maintain the position of a metal or magnetic insert in place within a hat by creating leverage against the top of the hat that can prevent the insert from moving upward and away from the fold made by the interior of a sweatband of a hat which would then cause the insert to fall downward out of the hat, in accordance with the present disclosure. FIG. 10 illustrates an embodiment of a vertical support 56 that is molded as a continuous part of a circular adjustable hat insert 48. FIG. 11 illustrates an embodiment of an attachable vertical support 58 that may be removably attached to a metal or magnetic insert. The vertical support 56, 58 may be attached to the metal or magnetic insert in a variety of ways, such as: by pressure fitted snaps 60, threading the vertical support 56, 58 through slots, adhesives, or any other feature for attachment. The vertical support 56, 58 may also have a feature for adjusting its length, such adjustment feature can be snaps 46 as seen on standard baseball caps, buckles, notches, slides, loops, or any other structure for adjustability.

The multiple embodiments of the metal or magnetic inserts or coupling headwear elements can be alternately coupled with the multiple embodiments of the detachable or permanently installed magnetic temple attachments to form the magnetic coupling of the glasses and headwear of this system. Two likely combinations of such embodiments are: (a) either a solid metal or metallic mesh insert coupled with removable magnetic temple attachments or (b) permanently installed solid metal or metallic mesh regions on headwear coupled with permanently installed magnets in the temples of glasses; either of which may have vertical supports.

The advantages of the removable insert and temple attachments are: (a) the removable insert and temple attachments are removable; (b) the removable insert and temple attachments can be installed on many different types of glasses and headwear so that the owner of the system can have one coupling of insert and temple attachments and wear multiple combinations of glasses and headwear; and (c) this coupling is cheap to produce, cheap to buy, and easy to install. The benefits of the permanently installed metallic headwear regions and permanently installed magnets in the temples of glasses are: (a) the magnets in the temples of the glasses can be larger than on removable temple attachments; (b) the magnets in the temples can more easily come into direct contact with the hat; and (c) the metallic regions on the headwear can come into direct contact with the magnets on the temples of the glasses, all of which create a more robust attachment of the glasses to the headwear.

It is contemplated that the removable coupling will be more useful for typical consumers, such as outdoor enthusiasts, because of price and removability; while the permanently installed coupling will be more useful to commercial users, such as construction workers, because of the more robust attachment of the glasses to the headwear.

It is to be understood that while certain forms of the invention are illustrated, it is not to be limited to the specific forms or arrangements herein described and shown. It will be apparent to those skilled in the art that various changes may be made without departing from the scope of the present disclosure; and the present disclosure is not to be considered limited to what is shown and described in the specification and any drawings/figures included herein.

One skilled in the art will readily appreciate that the present disclosure is well adapted to carry out the objectives and obtain the ends and advantages mentioned, as well as those inherent therein. The embodiments, methods, procedures, and techniques described herein are presently representative of the preferred embodiments; are intended to be exemplary; and are not intended as limitations on the scope. Changes therein and other uses will occur to those skilled in the art which are encompassed within the spirit of the present disclosure and are defined by the scope of the claims. Although the subject matter of the present disclosure has been described in connection with specific preferred embodiments, it should be understood that the subject matter of the present disclosure, as claimed, should not be unduly limited to such specific embodiments. Indeed, various modifications of the described modes for carrying out the subject matter of the present disclosure which are apparent to those skilled in the art are intended to be within the scope of the claims.

What is claimed is:

1. A retention system, the system comprising:
    an insert concealingly disposable in relation to headwear, the insert having at least one portion comprising a first magnetic material; and
    a second magnetic material concealingly disposable in relation to eyewear; and
    the first magnetic material adapted for concealingly coupling with the second magnetic material by way of the insert.

2. The system of claim 1, wherein said insert further comprises crumple zones.

3. The system of claim 1, wherein said insert further comprises folded edges.

4. The system of claim 1, wherein said insert further comprises an adhesive.

5. The system of claim 1, wherein said insert further comprises textures or hooks that help to securely attach said insert in said headwear.

6. The system of claim 1, wherein said insert further comprises an adjustable circumference.

7. The system of claim 1, wherein said insert further comprises foldable tabs with snap attachments to said headwear.

8. The system of claim 1, wherein said insert comprises a single piece of metal.

9. The system of claim 1, further comprising a vertical support.

10. The system of claim 9, wherein said vertical support comprises a configuration selected from a group consisting essentially of being integrally formed with the insert and being removably coupled with said insert.

11. The system of claim 9, wherein said insert further comprises means for adjusting its circumference.

12. The system of claim 1, wherein said second magnetic material comprises a plurality of magnets attached to each arm of the eyewear.

13. The system of claim 12, wherein said plurality of magnets is embedded in each arm of the eyeglasses eyewear.

14. The system of claim 1, further comprising a removable elastic material for coupling said second magnetic material to said eyewear.

15. The system of claim 14, wherein said removable elastic material is capable of coupling a plurality of magnets to each arm of the eyewear.

16. The system of claim 1, wherein said first magnetic material is located inside the headwear.

17. The system of claim 1, wherein the insert comprises a metal mesh.

18. The system of claim 1, further comprising a vertical support,
    wherein said insert further comprises an adjustable circumference, and
    wherein said vertical support comprises a configuration selected from a group consisting essentially of being integrally formed with the insert and being removably coupled with said insert.

19. The system of claim 17,
    wherein said insert further comprises crumple zones,
    wherein said insert further comprises folded edges, and
    wherein said insert further comprises foldable tabs with snap attachments to said headwear.

20. The system of claim 1, further comprising:
    a vertical support; and
    a removable elastic material for coupling said second magnetic material to said eyewear,
    wherein said insert further comprises crumple zones,
    wherein said insert further comprises folded edges,
    wherein said insert further comprises an adhesive,
    wherein said insert further comprises textures or hooks that help to securely attach said insert in said headwear,
    wherein said insert further comprises an adjustable circumference,
    wherein said insert further comprises foldable tabs with snap attachments to said headwear,
    wherein said insert comprises one of a single piece of metal and a metal mesh,
    wherein said vertical support comprises a configuration selected from a group consisting essentially of being integrally formed with the insert and being removably attachable,
    wherein said insert further comprises means for adjusting its circumference,
    wherein said second magnetic material comprises a plurality of magnets being disposed in one configuration of being attached to each arm of the eyewear, being embedded in each arm of the eyewear, being removably coupled to each arm of the eyewear by said removable elastic material, and
    wherein said first magnetic material is located inside the headwear.

* * * * *